A. A. PAULY.
TRUCK.
APPLICATION FILED NOV. 18, 1915. RENEWED FEB. 23, 1918.
1,320,706.
Patented Nov. 4, 1919.
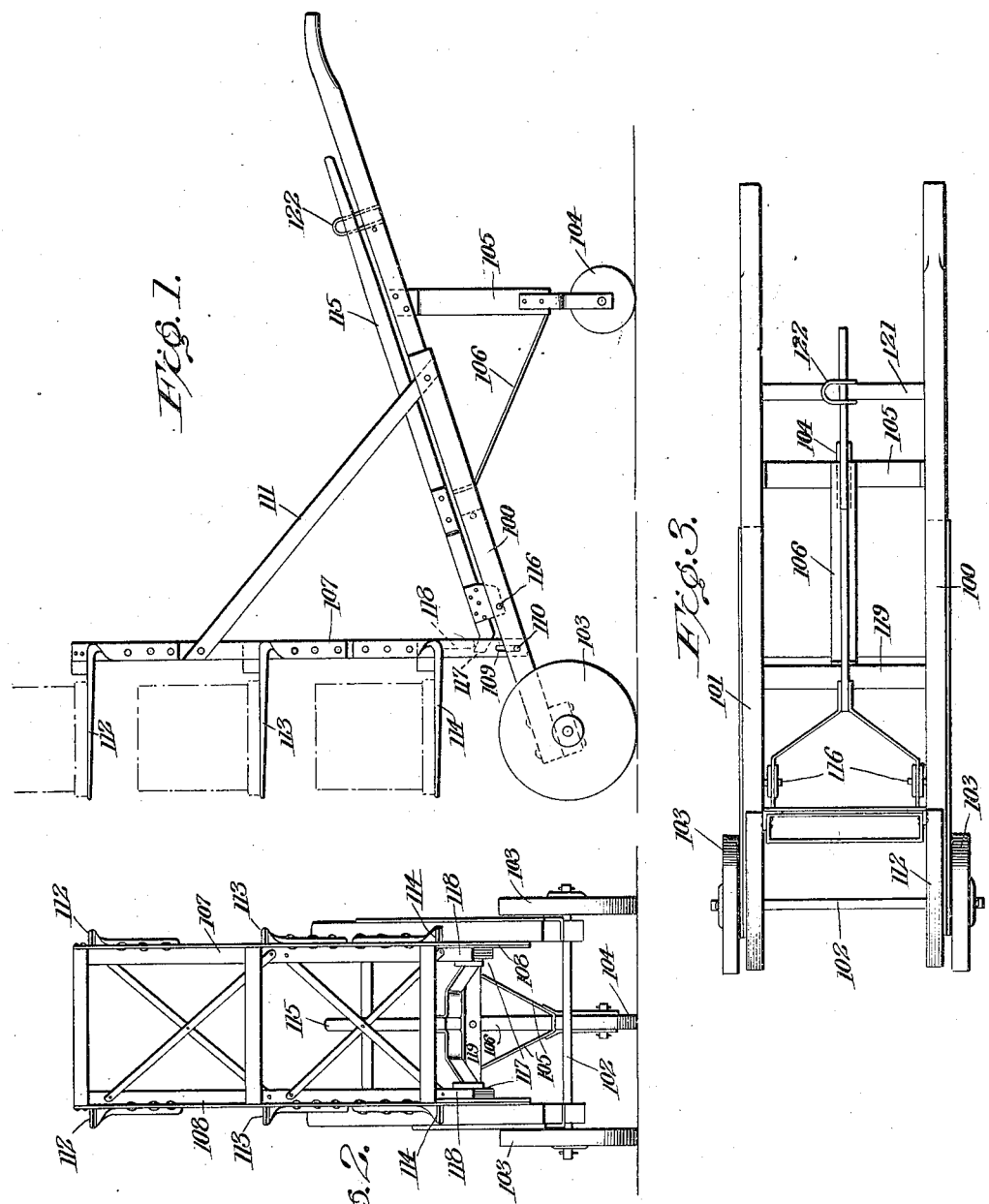
Witnesses
G. T. Baker
B. M. Kent
Inventor
Albert A. Pauly
by Foster Freeman Watson & Coit
Attorneys

UNITED STATES PATENT OFFICE.

ALBERT A. PAULY, OF CLEVELAND, OHIO.

TRUCK.

1,320,706.  Specification of Letters Patent.  Patented Nov. 4, 1919.

Original application filed March 27, 1915, Serial No. 17,457. Divided and this application filed November 18, 1915, Serial No. 62,187. Renewed February 23, 1918. Serial No. 218,895.

*To all whom it may concern:*

Be it known that I, ALBERT A. PAULY, a citizen of the United States, residing at Cleveland, Cuyahoga county, State of Ohio, have invented certain new and useful Improvements in Trucks, of which the following is a specification.

This invention relates to trucks and more particularly to trucks for handling freshly molded concrete articles. The present application is a division of my earlier application No. 17,457, filed March 27, 1915, renewed January 31, 1918, Serial No. 214,786.

It is the object of the invention to provide a truck which will be adapted to remove several mold boards from an elevator such as is shown in my earlier application aforesaid, and transport them to a kiln and simultaneously deposit all of the boards upon suitable racks. The foregoing illustrates one specific use for my improved truck, but it will be evident that it is not in any way limited to this particular use.

A truck embodying my invention is illustrated in the accompanying drawings, in which, Figure 1 is a side elevation;
Fig. 2 is an end elevation;
Fig. 3 is a plan.

Referring to the drawings, it will be seen that the truck comprises side bars 100 and 101 which are inclined as shown in Fig. 1 and provided with handles at their upper ends and have arranged on their lower ends an axle 102 on which the wheels 103 are journaled. The truck is provided with a third wheel 104 which is carried by a leg 105 having its upper ends secured to the side bars 100 and 101 and supported by a bracing member 106. An upright frame comprising the side members 107 and 108 is supported on the truck frame. The lower ends of the side members 107 and 108 are provided with elongated slots 109 in which are arranged pins 110 carried by the side members 100 and 101 of the truck frame for the purpose of forming a connection with the lower end of the upright frame. The upright frame is braced by means of the bars 111 which are pivotally connected with the side members 100 and 101 of the truck frame and with the side members 107 and 108 of the upright frame. The upright frame is provided with pairs of forwardly projecting brackets 112, 113 and 114 which are secured to the side members 107 and 108 and are adapted to support the boards on which the articles rest. In order to provide for conveniently and rapidly loading the truck from the elevator, means are provided for raising and lowering the upright frame of the truck, this means consisting of a lever 115 which has a forked lower end the side members of which are pivoted on pins 116 on the side members 100 and 101 of the truck frame. The extremities of the forked lower end of the lever 115 are provided with toes 117 which engage flanges or lugs 118 projecting inwardly on the members 107 and 108, as clearly shown in Figs. 1 and 2. The members 101 and 102 are connected by the cross members 119 and 121 and the member 121 has pivotally mounted thereon a locking hook 122 which, as shown in Figs. 1 and 3, is adapted to engage the lever 115 and thereby hold the upright frame in the elevated position. From Fig. 1 it will be evident that when the lever 115 is swung upwardly the upright frame will descend.

In the operation of the truck in connection with the apparatus disclosed in my aforesaid earlier application the boards or carriers, with the articles thereon, are supported one above the other and separated by the distance between the brackets 112, 113 and 114. The lever 115 is raised for the purpose of permitting the brackets to assume their lowermost position and then the truck is moved to position the brackets below the boards or carriers. The lever 115 is then drawn down and locked in the position shown in Fig. 1, thereby lifting the brackets into engagement with the boards or carriers and then raising the latter from their supports. The truck may then be wheeled to any desired point and the boards, with the articles thereon, deposited on suitably spaced supports by raising the lever 115. The truck may then be withdrawn.

Having thus described the invention, what is claimed and desired to be secured by Letters Patent is:

1. A truck comprising a frame supported on wheels, a vertically adjustable member having one or more brackets projecting therefrom, means at the lower end of said member forming a sliding connection with the frame for guiding the member in its movements, one or more links connecting the upper part of said member with the truck frame, and means independent of said links carried by the truck frame for raising and lowering said member.

2. A truck comprising a pair of horizontally inclined side frames supported on wheels, a vertically arranged member having a sliding connection with said side frames at its lower end, braces connected with the upper part of said member and permitting vertical movement of the member, and a lever pivotally supported by said side frames and engaging said member so as to support the latter and control its vertical movements.

In testimony whereof I affix my signature.

ALBERT A PAULY.

Copies of this patent may be obtained for five cents each, by addressing the "Commissioner of Patents, Washington, D. C."